United States Patent
Yang et al.

(10) Patent No.: US 12,075,475 B2
(45) Date of Patent: Aug. 27, 2024

(54) INFORMATION TRANSMISSION METHOD AND DEVICE, AND STORAGE MEDIUM

(71) Applicant: ZTE CORPORATION, Shenzhen (CN)

(72) Inventors: Ling Yang, Shenzhen (CN); Yajun Zhao, Shenzhen (CN); Xincai Li, Shenzhen (CN); Hanqing Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 531 days.

(21) Appl. No.: 17/294,639

(22) PCT Filed: Sep. 19, 2019

(86) PCT No.: PCT/CN2019/106680
§ 371 (c)(1),
(2) Date: May 17, 2021

(87) PCT Pub. No.: WO2020/057600
PCT Pub. Date: Mar. 26, 2020

(65) Prior Publication Data
US 2021/0410187 A1    Dec. 30, 2021

(30) Foreign Application Priority Data
Sep. 21, 2018    (CN) .......................... 201811110863.9

(51) Int. Cl.
*H04W 74/0816*    (2024.01)
*H04L 27/26*    (2006.01)
*H04W 16/28*    (2009.01)
*H04W 74/00*    (2009.01)

(52) U.S. Cl.
CPC ... *H04W 74/0816* (2013.01); *H04L 27/26025* (2021.01); *H04W 16/28* (2013.01); *H04W 74/006* (2013.01)

(58) Field of Classification Search
None
See application file for complete search history.

(56) References Cited

U.S. PATENT DOCUMENTS

| 2018/0242232 A1 | 8/2018 | Chendamarai Kannan et al. |
| 2019/0373635 A1 | 12/2019 | Yang et al. |
| 2019/0387412 A1* | 12/2019 | Kim ..................... H04W 56/00 |

(Continued)

FOREIGN PATENT DOCUMENTS

| CN | 106455117 A | 2/2017 |
| CN | 106658718 A | 5/2017 |
| CN | 107734560 A | 2/2018 |

(Continued)

OTHER PUBLICATIONS

Extended European Search Report for Application No. 19863310.9, dated Jan. 3, 2023, 10 pages.

(Continued)

*Primary Examiner* — Suhail Khan
(74) *Attorney, Agent, or Firm* — Morgan, Lewis & Bockius LLP

(57) ABSTRACT

Provided are an information transmission method, apparatus and device. The method includes that a device performs an information transmission on configured resources.

8 Claims, 6 Drawing Sheets

(56) References Cited

U.S. PATENT DOCUMENTS

2020/0336193 A1* 10/2020 Park .................... H04W 76/28

FOREIGN PATENT DOCUMENTS

| CN | 107889113 A | 4/2018 |
|----|----|----|
| CN | 108024363 A | 5/2018 |
| CN | 108028686 A | 5/2018 |
| WO | WO-2018/045307 A1 | 3/2018 |
| WO | WO-2019/059512 A1 | 4/2018 |
| WO | WO-2019/160741 A1 | 8/2019 |

OTHER PUBLICATIONS

International Search Report for Application No. PCT/CN2019/106680, dated Dec. 19, 2019, 4 pages including English translation.
Search Report for Chinese Application No. 201811110863.9, dated Oct. 7, 2023, 8 pages including English translation.
Office Action for Chinese Application No. 201811110863.9, dated Oct. 7, 2023, 12 pages including English translation.

* cited by examiner

INFORMATION TRANSMISSION METHOD AND DEVICE, AND STORAGE MEDIUM

CROSS-REFERENCE TO RELATED APPLICATIONS

This is a National Stage Application, filed under 35 U.S.C. 371, of International Patent Application No. PCT/CN2019/106680, filed on Sep. 19, 2019, which claims priority to Chinese Patent Application No. 201811110863.9 filed with the CNIPA on Sep. 21, 2018, the disclosures of which are incorporated herein by reference in their entireties.

TECHNICAL FIELD

The present disclosure relates to, but is not limited to, the field of communications.

BACKGROUND

At Radio Access Network (RAN) Plenary #75, a research topic is newly established: an assisted access to an unlicensed carrier in New Radio (NR). This project aims to study how to complete NR deployment on an unlicensed spectrum.

According to regulatory requirements of the European Telecommunications Standards Institute (ETSI), a device needs to perform a Listen Before Talk (LBT) mechanism before performing a transmission on the unlicensed spectrum. If it is detected through the LBT that a channel is clear, the device is allowed to use the channel within a Maximum Channel Occupancy Time (MCOT). Here, before the channel is used within the MCOT, the device performs a new extended Clear Channel Assessment (CCA) such as Category 4 Listen Before Talk (Cat4 LBT).

In Licensed Assisted Access (LAA) Long-Term Evolution (LTE), the device performs LBT detection and transmissions in an omnidirectional mode. In NR, the device generally performs transmissions in a directional beam mode. Therefore, if an omnidirectional LBT mechanism in an LAA LTE stage is still used, the probability of a channel access is reduced, a transmission fails and so on.

SUMMARY

Embodiments of the present disclosure provide an information transmission method, apparatus and device.

An embodiment of the present disclosure provides an information transmission method. The method includes that a device performs an information transmission on configured resources.

An embodiment of the present disclosure further provides an information transmission apparatus including a transmission module. The transmission module is configured to perform an information transmission on configured resources.

An embodiment of the present disclosure further provides an information transmission device. The information transmission device includes a memory, a processor and a computer program stored in the memory and executable by the processor. The processor performs the information transmission method when executing the computer program.

Other features and advantages of the present disclosure will be elaborated hereinafter in the description and partially become apparent from the description, or will be understood through implementations of the present disclosure. The object and other advantages of the present disclosure may be implemented and obtained through structures set forth in the description, claims and drawings.

BRIEF DESCRIPTION OF DRAWINGS

The drawings are used to provide a further understanding of the schemes of the present disclosure, constitute a part of the description, explain the schemes of the present disclosure in conjunction with embodiments of the present disclosure, and do not limit the solutions of the present disclosure.

DETAILED DESCRIPTION

Figure 1:
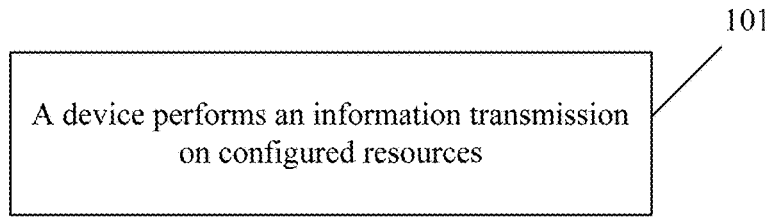
FIG. 1 is a flowchart of an information transmission method according to an embodiment of the present disclosure.

Embodiments of the present disclosure are described below in detail in conjunction with the drawings. It is to be noted that if not in collision, the embodiments and features therein in the present disclosure may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

In LAA LTE, a base station has been supported to use a channel within an MCOT and may share only with a User Equipment (UE) within the MCOT, where the UE receives downlink data from the base station. That is to say, only a downlink+uplink (D+U) structure, one switching point between downlink and uplink, is supported within the MCOT. The base station uses a Cat4 LBT mechanism for using the channel within the MCOT and UEs that share the MCOT need to execute only a Cat2 LBT mechanism before an uplink transmission.

Further, in the LAA LTE, a device performs LBT detection and transmissions in an omnidirectional mode. In NR, the device generally performs transmissions in a directional beam mode. Thus, if an omnidirectional LBT mechanism in an LAA LTE stage is still used, it is impossible to accurately reflect a level of interference within the range of a directional sending beam, reducing the probability of a channel access. On the other hand, if the device adopts the omnidirectional LBT mechanism, performs sending in the directional beam mode, and does not perform the LBT before a continuous transmission in different directional beam directions, the transmission may fail due to strong interference in a switched beam direction. This is because a channel in the switched directional beam direction is reserved or occupied in advance before the beam direction is switched. Additionally, in the case where a continuous transmission is performed in the same directional beam direction, even if the device has detected that a channel corresponding to the directional beam direction is clear before the continuous transmission, interference fluctuations of the channel at different moments are different so that a transmission on a resource for the continuous transmission in the beam direction that is previously detected to be clear is greatly interfered and the transmission failure occurs. There is a need to provide a channel access manner when the same directional beam and different directional beams are used for a transmission on resources for the continuous transmission.

Additionally, at the 3rd Generation Partnership Project (3GPP) RAN1 #92bis meeting, a consensus has reached on the case where more than one switching point is supported within a Transmission Opportunity (TxOP) or the MCOT. Therefore, it is necessary to study a channel access manner for uplink and downlink channel/signal transmissions in the case of multiple switching points and a channel access manner in the case where a terminal, the UE, initiates the MCOT, for example, the MCOT is shared with different UEs.

As shown in FIG. 1, an embodiment of the present disclosure provides an information transmission method, and the method includes step 101. In step 101, a device performs an information transmission on configured resources.

In an embodiment, before the device performs the information transmission on the configured resources, the method further includes that the device performs a clear channel detection according to at least one of a particular LBT mechanism or a particular LBT mode.

In an embodiment, the step in which the device performs the information transmission on the configured resources includes that the device performs the information transmission on the configured resources in the same beam direction.

In an embodiment, the step in which the device performs the information transmission on the configured resources in the same beam direction includes steps described below.

The device detects that a channel is clear on a resource n and performs the information transmission in a beam direction i; and the device may not perform a clear channel detection and/or perform the information transmission in the beam direction i on a resource n+1 or a subsequent configured resource.

In an embodiment, the step in which the device performs the information transmission on the configured resources includes that the device performs the information transmission on the configured resources in a switched beam direction or in different beam directions.

In an embodiment, the step in which the device performs the information transmission on the configured resources in the switched beam direction or in the different beam directions includes steps described below. The device performs a clear channel detection according to at least one of a particular LBT mechanism or a particular LBT mode before the transmission on a resource corresponding to the different beam directions or before the transmission on a resource corresponding to the switched beam direction, and in response to detecting that a channel is clear, the device performs the transmission on the configured resources in one of a beam direction corresponding to a current resource or the switched beam direction.

In an embodiment, before the device performs the information transmission on the configured resources, the method further includes that the device performs a clear channel detection using an LBT mechanism based on a single beam direction; and in response to detecting that a channel is clear, the device performs the information transmission on the configured resources in a beam direction in which the channel is detected to be clear.

In an embodiment, before the device performs the information transmission on the configured resources, the method further includes steps described below. In response to the device performing a clear channel detection using an LBT mechanism based on a single beam direction, in response to detecting that a channel is busy, the device abandons performing the information transmission on a current resource. Alternatively, in response to detecting that a channel is busy, the device continues the clear channel detection according to at least one of a previous LBT mode or a previous LBT mechanism before a next candidate transmission start position. Alternatively, in response to detecting that a channel is busy, the device changes at least one of a beam direction in which the LBT mechanism is performed, the LBT mechanism, or an LBT mode and retries the clear channel detection. Alternatively, in response to detecting that a channel is busy, the device performs the clear channel detection using a simplified LBT mechanism of a previous LBT mechanism or using a fast LBT mechanism.

In an embodiment, before the device performs the information transmission on the configured resources, the method further includes steps described below. In response to the device performing a clear channel detection using an LBT mechanism based on multiple beam directions, in response to a beam direction in which a channel is detected to be clear, the device performs the information transmission on the configured resources in the beam direction in which the channel is detected to be clear. Alternatively, in response to a beam direction in which a channel is detected to be clear containing a beam direction corresponding to the configured resources, the information transmission is performed in the beam direction corresponding to the configured resources. Alternatively, in response to the number of beam directions in which a channel is detected to be clear being greater than or equal to 1, the information transmission is simultaneously performed on the configured resources in the beam directions in which the channel is detected to be clear. Alternatively, in response to the number of beam directions in which a channel is detected to be clear being greater than or equal to 1, the information transmission is performed in one beam direction selected according to a particular rule from the beam directions in which the channel is detected to be clear.

In an embodiment, before the device performs the information transmission on the configured resources, the method further includes steps described below. In response to the device performing a clear channel detection using LBT based on multiple beam directions, in response to detecting that a channel is busy, the device abandons performing the transmission on a current resource. Alternatively, in response to detecting that a channel is busy, the device continues the clear channel detection according to at least one of a previous LBT mode or a previous LBT mechanism before a next candidate transmission start position. Alternatively, in response to detecting that a channel is busy, the device changes a beam direction in which the LBT is performed and retries the clear channel detection. Alternatively, in response to detecting that a channel is busy, the device performs the clear channel detection in the multiple beam directions by using a simplified LBT mechanism of a previous LBT mechanism or using a fast LBT mechanism before a next candidate transmission start position.

In an embodiment, the step in which the device performs the information transmission on the configured resources includes a step described below. The device performs the transmission on the configured resources in multiple beam directions. Alternatively, the device performs a clear channel detection on the configured resources using an LBT mechanism based on multiple beam directions, and the device performs the information transmission on a current resource in a beam direction containing a beam direction corresponding to at least one of subsequent resources; alternatively, the device performs the transmission on the configured resources simultaneously in the multiple beam directions, where the number of beams has a decreasing trend as a resource index increases.

In an embodiment, the method further includes that during the information transmission on the configured resources, the device performs a clear channel detection in response to the device receiving a dynamic signaling indication.

In an embodiment, the dynamic signaling indication includes at least one of: a trigger for performing the clear channel detection, an indication of an LBT mechanism, an indication of an LBT mode, a timing relationship between trigger signaling positions and clear channel detection/transmission resources, a start position of LBT, the number of symbols occupied by LBT, a Subcarrier Spacing (SCS), a beam direction, an indication of whether to support beam switching, an indication of whether to support a partial symbol, a candidate data transmission start point or a set of candidate data transmission start points, a priority of performing LBT, or at least one parameter in a parameter set corresponding to an LBT mechanism.

In an embodiment, before the device performs the information transmission on the configured resources, the method further includes steps described below. The device performs a clear channel detection according to at least one of a particular LBT mechanism or a particular LBT mode. In response to detecting that a channel is clear, the device initiates an MCOT or a TxOP or performs the information transmission.

In an embodiment, within the MCOT, the device performs, at a switching point which is at least one of a switching point from uplink to downlink or a switching point from downlink to uplink, the clear channel detection according to at least one of a particular rule, the particular LBT mechanism, or the particular LBT mode.

In an embodiment, the particular rule includes at least one of rules one to ten described below.

Rule one: in response to at least one of a gap between downlink and uplink or a gap between uplink and downlink being less than or equal to a first threshold, the device does not perform an LBT mechanism or the clear channel detection.

Rule two: in response to at least one of a gap between downlink and uplink or a gap between uplink and downlink being less than a second threshold or being greater than or equal to a first threshold and less than or equal to a second threshold, the device performs a Cat2 LBT mechanism or performs a Cat2 LBT mechanism M times.

Rule three: in response to at least one of a gap between downlink and uplink or a gap between uplink and downlink being greater than a second threshold, the device performs an LBT mechanism which is the same as or has a higher priority than an LBT mechanism performed when the MCOT is initiated.

Rule four: at a switching point which is at least one of the switching point from uplink to downlink or the switching point from downlink to uplink, the device performs a Cat2 LBT mechanism or performs a Cat2 LBT mechanism M times.

Rule five: at a switching point which is at least one of the switching point from uplink to downlink or the switching point from downlink to uplink, the device uses an LBT mechanism which is the same as an LBT mechanism used when the MCOT is initiated.

Rule six: at a switching point which is at least one of the switching point from uplink to downlink or the switching point from downlink to uplink, the device uses an LBT mechanism which has a higher priority than an LBT mechanism used when the MCOT is initiated.

Rule seven: at a switching point which is at least one of the switching point from uplink to downlink or the switching point from downlink to uplink, the device determines a used LBT mechanism according to a transmitted traffic type or a traffic type/channel/channel priority.

Rule eight: at a switching point which is at least one of the switching point from uplink to downlink or the switching point from downlink to uplink, the device determines an LBT mechanism according to a transmitted time domain/subframe/slot structure.

Rule nine: in response to the number of times a Cat2 LBT mechanism is performed at a switching point which is at least one of the switching point from uplink to downlink or the switching point from downlink to uplink exceeding a particular threshold, the device performs the particular LBT mechanism at a next switching point.

Rule ten: in response to the number of switching points which are at least one of the switching point from uplink to downlink or the switching point from downlink to uplink being greater than a particular threshold, the device performs the particular LBT mechanism.

In an embodiment, at least one of the first threshold, the second threshold, the transmitted time domain/subframe/slot structure, the number of switching points, the particular threshold, a relationship between transmitted time domain/subframe/slot structures and LBT mechanisms/priorities of LBT mechanisms, a duration of a gap, a start position of the switching point, an end position of the switching point, the number of times the Cat2 LBT mechanism is performed, the LBT mode, the LBT mechanism, a start position of LBT, the number of symbols occupied by LBT, a Subcarrier Spacing (SCS), a beam direction, an indication of beam switching, an indication of whether to support a partial symbol, a candidate data transmission start point or a set of candidate data transmission start points, a priority of LBT, a parameter set corresponding to the LBT mechanism, or M may be acquired through at least one of: a predefined manner, a physical layer Downlink Control Information (DCI) signaling indication, a higher layer Radio Resource Control (RRC) signaling indication, or a Media Access Control (MAC) signaling indication.

In an embodiment, the number of switching points, the number of times allowing the Cat2 LBT mechanism to be performed within the MCOT, or M may be acquired by at least one of: determining according to a duration of the MCOT/TxOP; determining according to a duration of a gap allowed within the MCOT/TxOP; determining according to a number of scheduling units/a structure of a scheduling unit; determining according to an SCS; or determining according to a ratio of a duration of the MCOT/TxOP to a gap.

In an embodiment, the particular LBT mode includes at least one of: an omnidirectional LBT mode; an LBT mode in multiple beam directions; an LBT mode in a wide beam direction; or an LBT mode in a single beam direction.

In an embodiment, the particular LBT mechanism includes at least one of: a Cat4 LBT mechanism; a Cat2 LBT mechanism; performing a Cat2 LBT mechanism M times; a Cat4 LBT mechanism with a high priority; a Cat3 LBT mechanism; a Cat4 LBT mechanism with a random backoff value of N; an LBT mechanism with a duration of a defer period; or an LBT mechanism obtained by scaling at least one of the preceding mechanisms according to an SCS; where M and N are positive integers.

In an embodiment, the method further includes that different devices multiplex the configured resources for information transmissions. The different devices performing the transmissions on the configured resources use different beam indexes or the different devices simultaneously perform a clear channel assessment on multiple beam indexes.

In an embodiment, if the different devices use a beam with the same index, the device performs a clear channel detection according to at least one of a first detection threshold or a second detection threshold in a direction of the beam.

In an embodiment, the method further includes that different devices multiplex the configured resources for information transmissions. The different devices exchange information before performing the information transmissions on the configured resources.

In an embodiment, the exchanged information includes at least one of: beam index information, time domain resource information, a time domain pattern, frequency domain resource information, an SCS, a transmission structure of an MCOT, a subframe/slot structure, an LBT mechanism, an LBT position, or an LBT mode.

In the present disclosure, the LBT mode includes at least one of: an omnidirectional LBT mode; an LBT mode in multiple beam directions; an LBT mode in a wide beam direction; or an LBT mode in a single beam direction. The LBT mode in multiple beam directions refers to that the multiple beam directions in which LBT is performed are beam directions corresponding to a continuous transmission or beam directions contained in the TxOP/MCOT. The LBT mode in the wide beam direction refers to that the wide beam direction covers/contains the beam directions corresponding to the continuous transmission or the beam directions contained in the TxOP/MCOT.

The LBT mechanism includes at least one of a Cat4 LBT mechanism, a Cat2 LBT mechanism, performing a Cat2 LBT mechanism M times, a Cat4 LBT mechanism with a random backoff value of N (containing no defer period), a Cat4 LBT mechanism with a random backoff value of N (containing a defer period), an LBT mechanism with a duration of a defer period, or an LBT mechanism obtained by scaling the preceding LBT mechanism according to the SCS.

At least one of M, N, the LBT mechanism, the SCS, the LBT mode, a start position/candidate position of LBT, the transmission structure of the MCOT, a position of the switching point, or the number of switching is acquired by at least one of the predefined manner, the physical layer DCI signaling indication, the higher layer RRC signaling indication, or the MAC signaling indication.

Performing the Cat2 LBT M times may represent performing the Cat2 LBT mechanism M times or performing the Cat2 LBT mechanism M times with one LBT success.

The dynamic signaling includes at least one of physical layer Downlink Control Information (DCI) signaling, higher layer Radio Resource Control (RRC) signaling, or Media Access Control (MAC) signaling.

An embodiment of the present disclosure provides a channel access manner in the case of a continuous downlink/uplink transmission.

Figure 2:
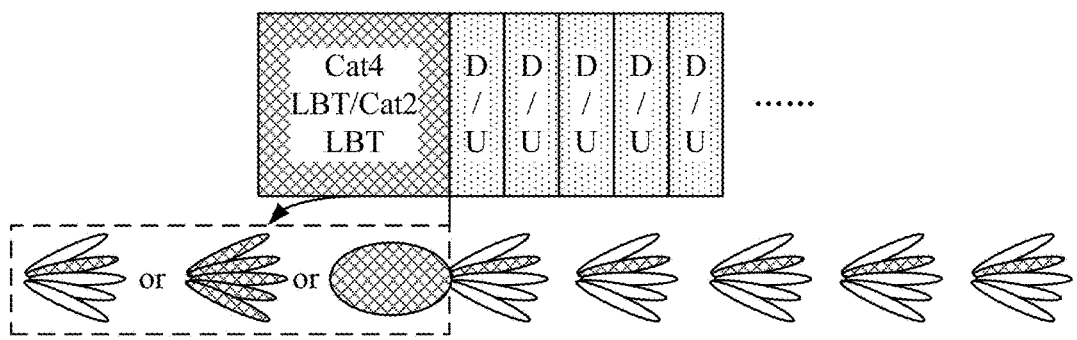
FIG. 2 is a schematic diagram of a channel access manner and a transmission manner of a base station/UE in the case of a continuous transmission according to an embodiment of the present disclosure.

In the case where the continuous downlink/uplink transmission uses the same directional beam, an LBT mechanism performed by a device includes one of an LBT mechanism in a single beam direction, an LBT mechanism in multiple beam directions, or an LBT mechanism in a wide beam direction. If it is detected according to the LBT mechanism that a channel is clear, the device continues the transmission in a direction of the directional beam. As shown in FIG. 2, FIG. 2 is a schematic diagram of a channel access manner and a transmission manner of a base station/UE in the case of a continuous transmission. As can be seen from FIG. 2, the base station or the UE uses the Cat4 or Cat2 LBT mechanism in the single beam direction/multiple beam directions/wide beam direction before performing the information transmission on a resource for the continuous transmission. The base station/UE uses the Cat4 LBT mechanism before the continuous transmission or before initiating an MCOT. If the base station/UE performs the continuous transmission within the MCOT, the base station/UE performs the Cat2 LBT mechanism before performing the information transmission.

Figure 3:
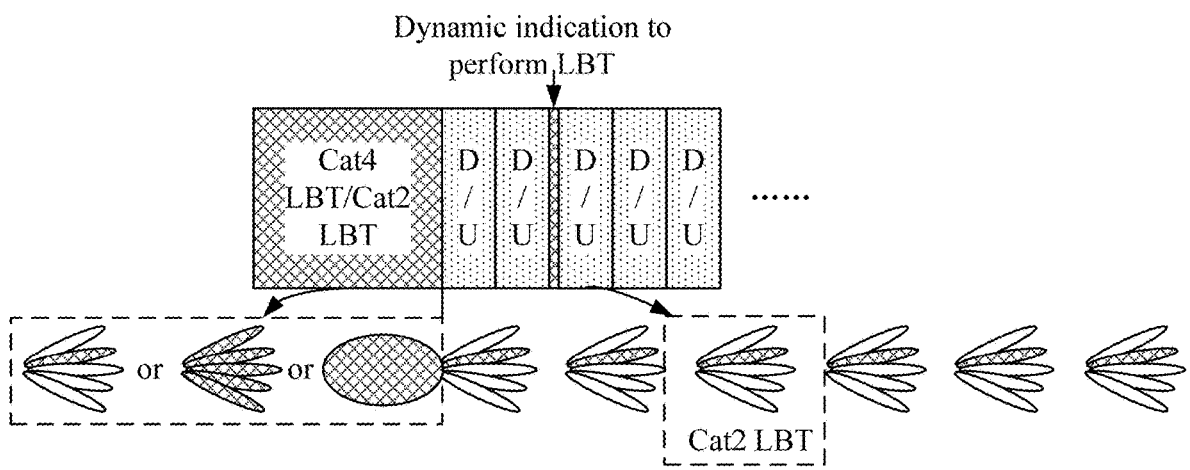
FIG. 3 is a schematic diagram of a channel access manner of a base station/UE through a dynamic indication in the case of a continuous transmission according to an embodiment of the present disclosure.

In another case, when the continuous downlink/uplink transmission uses the same directional beam, since channel interference fluctuates differently at different time, the base station/UE may be triggered via dynamic signaling to determine whether a channel is clear, that is, to perform an LBT mechanism during the continuous transmission, so as to improve the probability of a transmission/reception success. The dynamic signaling may indicate at least one of a trigger for performing the LBT mechanism, an LBT mode, a start position of LBT, a position of the LBT mechanism, the LBT mechanism, an SCS, a beam direction, or the like. To prevent the channel from being preempted during the continuous transmission, the base station/UE may perform a fast LBT mechanism such as a Cat2 LBT mechanism, or perform a Cat2 LBT mechanism M times, or perform a Cat4 LBT mechanism with a random backoff value of N (containing no defer period), or perform a Cat4 LBT mechanism with a random backoff value of N (containing a defer period), or perform an LBT mechanism with a duration of a defer period, or perform an LBT mechanism obtained by scaling the preceding LBT mechanism according to the SCS. As shown in FIG. 3, FIG. 3 is a schematic diagram of a channel access manner of a base station/UE through a dynamic signaling indication in the case of a continuous transmission. As can be seen from FIG. 3, the base station/UE performs the Cat2 LBT according to the dynamic signaling indication. If the dynamic signaling only triggers to perform an LBT mechanism and does not notify which LBT mechanism to be performed, the Cat2 LBT is performed by default.

In another case, when the continuous downlink/uplink transmission uses different directional beams or if a directional beam is switched during the continuous transmission, the LBT mechanism in the multiple beam directions/wide beam direction/single directional beam direction is used before the continuous transmission. Further, the base station/UE uses the Cat4 LBT mechanism before the continuous transmission or before initiating the MCOT. If the base station/UE performs the continuous transmission within the MCOT, the base station/UE performs the Cat2 LBT mechanism before the information transmission.

In the case where the base station/UE uses the LBT mechanism in the single directional beam direction before the MCOT or the continuous transmission, if a channel is detected to be clear, the base station/UE starts the transmission and performs the transmission in a beam direction in which the channel is detected to be clear. If the directional beam direction is switched during the continuous transmission, the base station/UE may perform the fast LBT mechanism. In an embodiment, in the case where the directional beam direction is not switched during the continuous transmission, since channel interference fluctuates differently at different time, the base station/UE may be triggered via dynamic signaling to perform the fast LBT mechanism, so as to improve the probability of a transmission/reception success. The dynamic signaling may indicate at least one of the trigger for performing the LBT mechanism, the LBT mode, the start position of LBT, the position of the LBT mechanism, the LBT mechanism, the SCS, the beam direction, or the like. The fast LBT mechanism may be the Cat2 LBT mechanism, performing the Cat2 LBT mechanism M times, the Cat4 LBT mechanism with the random backoff value of N (containing no defer period), the Cat4 LBT mechanism with the random backoff value of N (containing the defer period), the LBT mechanism with the duration of the defer period, or the LBT mechanism obtained by scaling the preceding LBT mechanism according to the SCS.

In the case where the base station/UE uses an LBT mechanism in multiple directional beam directions before the MCOT or the continuous transmission, if a channel is detected to be clear, the transmission is performed in a corresponding beam direction. Since the base station/UE performs the transmission in a single directional beam direction, even if it is detected before the transmission that the channel is clear in multiple beam directions, the transmission is performed only in a certain single directional beam direction, which may result in a channel loss in a directional beam direction in which no transmission is performed. Therefore, once the directional beam is switched during the continuous transmission, the base station/UE needs to perform the fast LBT mechanism. Other manners are the same as those mentioned above. Similarly, if the base station/UE adopts the LBT mechanism in the wide beam direction before the MCOT or the continuous transmission, the processing manners are the same as the corresponding processing manners mentioned above.

Figure 4:
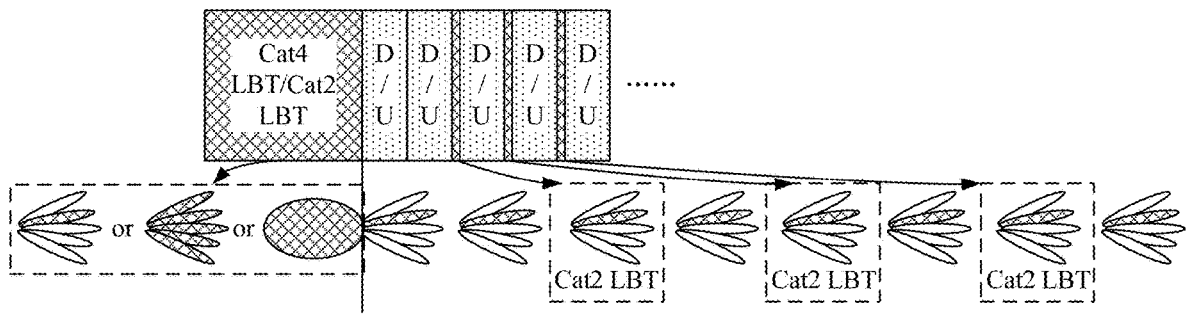
FIG. 4 is a schematic diagram of a channel access manner in the case of a continuous transmission in different directional beam directions according to an embodiment of the present disclosure.

As shown in FIG. 4, FIG. 4 is a schematic diagram of a channel access manner in the case of a continuous transmission in different directional beam directions. As can be seen from FIG. 4, the Cat2 LBT mechanism is performed before the transmission is performed in a switched directional beam direction, and an LBT mechanism such as the Cat2 LBT is performed according to a dynamic signaling indication in a beam direction in which the directional beam direction is not switched. If the dynamic signaling only triggers to perform an LBT mechanism and does not notify the specific LBT mechanism to be performed, the Cat2 LBT is performed by default.

Figure 5:
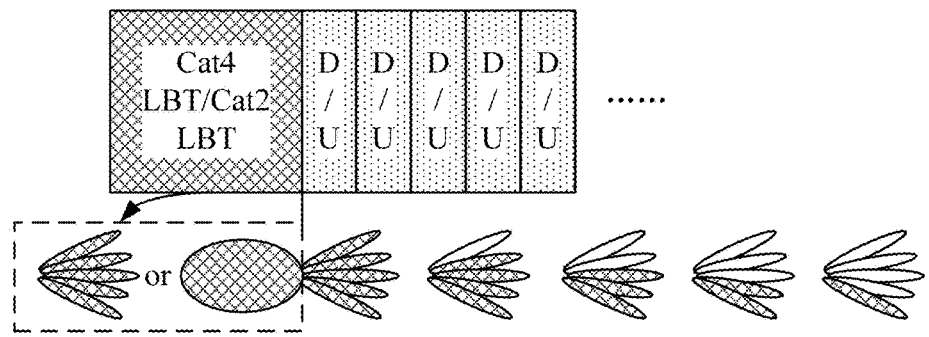
FIG. 5 is a schematic diagram of each transmission manner of a transmission on consecutive transmission resources when the number of beam directions is P to Q in sequence according to an embodiment of the present disclosure.
Figure 6:
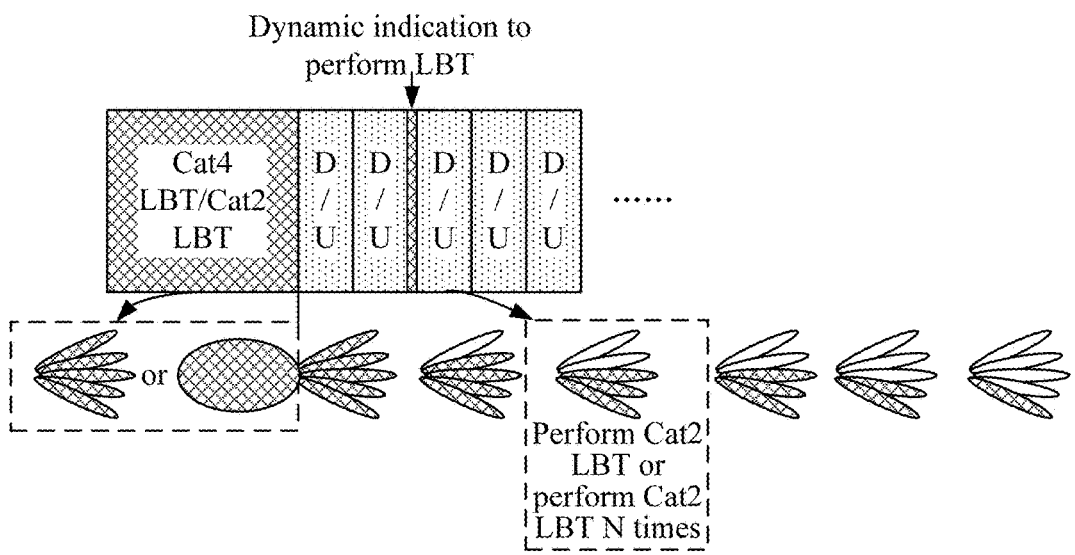
FIG. 6 is a schematic diagram illustrating that the number of beam directions has a decreasing trend in the case of a transmission on consecutive transmission resources and an LBT operation is indicated via dynamic signaling according to an embodiment of the present disclosure.

In another case, to reduce the number of times LBT is performed within the continuous transmission or the MCOT, the base station/UE uses the LBT mechanism in the multiple directional beam directions/wide beam direction/the omnidirectional LBT mechanism before the continuous transmission. If it is detected that the channel is clear, the base station/UE performs the transmission simultaneously in subsequent sending beam directions during the continuous transmission, so as to preoccupy beam directions for the subsequent transmission. The same transmission information as that in beam directions for the actual transmission, invalid information, indication information, a reference/measurement signal, or an uplink/downlink channel/signal may be sent in the preoccupied beam directions. As shown in FIG. 5, FIG. 5 is a schematic diagram of a transmission manner of a transmission on consecutive transmission resources when the number of beam directions is P to Q in sequence. P is the number of different beam directions among beams for the subsequent transmission, and Q is the number of different beam directions among beams transmitted on a current resource and on a subsequent resource. For example, if there are five consecutive transmission resources and each resource corresponds to a different beam direction, the base station/UE performs the transmission simultaneously in five beam directions on a first resource, the base station/UE performs the transmission simultaneously in four beam directions on a second resource, and so on. The base station/UE performs the transmission in one beam direction on a fifth resource. In an embodiment, the base station/UE may indicate an LBT operation according to the dynamic signaling on the consecutive transmission resources. As shown in FIG. 6, FIG. 6 is a schematic diagram illustrating that the number of beam directions has a decreasing trend in the case of a transmission on consecutive transmission resources and an LBT operation is indicated via dynamic signaling.

In another case, a difference of this case from the preceding case is that the base station/UE uses the LBT mechanism in the multiple directional beam directions/wide beam direction/the omnidirectional LBT mechanism before the continuous transmission. If it is detected that the channel is clear in at least one beam direction, the transmission is performed on a beam where the channel is detected to be clear. If the same beam direction is used for a previous transmission and a next transmission, the transmission is performed in a beam direction for the previous transmission. If the beam direction is switched for the previous transmission and the next transmission, a current transmission is not performed in a beam direction corresponding to the previous transmission. Alternatively, the previous transmission is performed only in an adjacent sending beam direction. Before a next transmission, the base station/UE may perform the LBT mechanism in a beam direction corresponding to a current resource and/or a beam direction corresponding to at least one of subsequent resources. If it is detected that the channel is busy in a beam direction corresponding to a next resource, the transmission is abandoned in the beam direction corresponding to the next resource and the transmission may be performed in the beam direction corresponding to the current resource. If it is detected that the channel is clear in beam directions among subsequent beam directions, the base station/UE may perform the transmission on the next resource not only in the corresponding beam direction but also in at least one of the beam directions in which the channel is detected to be clear. If a beam direction for the transmission on a previous resource contains a beam for the transmission on the next or subsequent resource, the device may not perform LBT before the next resource. Alternatively, simplified LBT is performed. Alternatively, the LBT operation is indicated according to the dynamic signaling.

In an embodiment, when the clear channel detection is performed using the LBT mechanism in the multiple beam directions, the beam directions in which the channel is detected to be clear are beam directions that are activated or used for the transmission on a subsequent resource.

Figure 7:
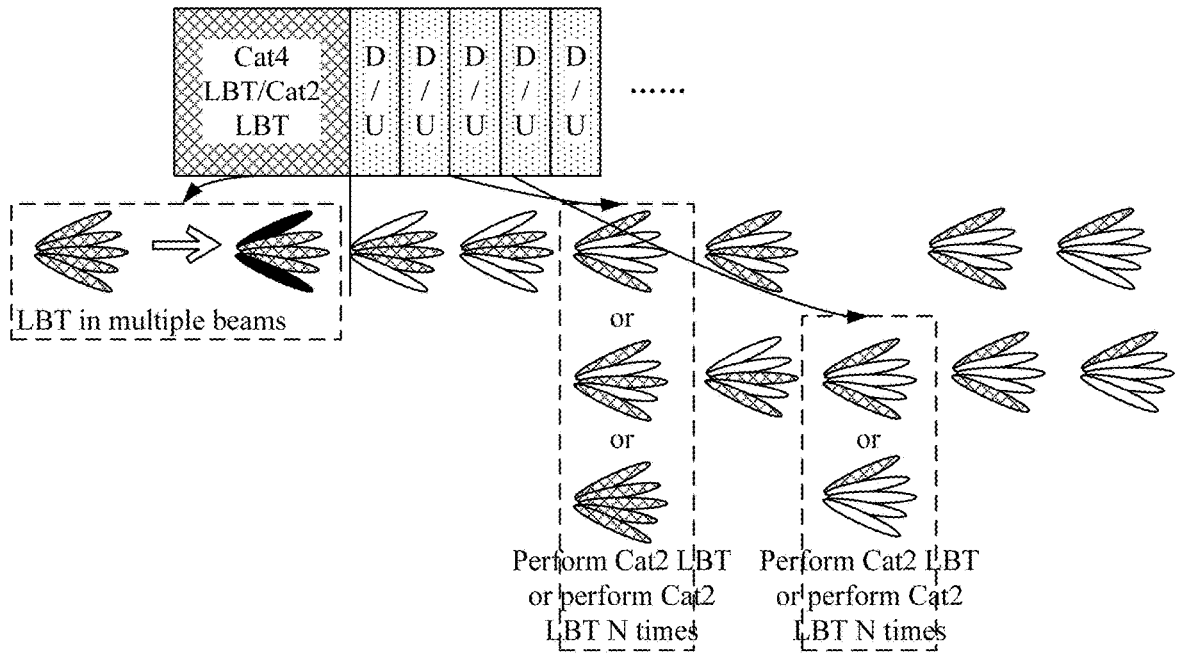
FIG. 7 is a schematic diagram of a transmission performed by a device simultaneously in beam directions in which a channel is detected to be clear according to an embodiment of the present disclosure.

As shown in FIG. 7, FIG. 7 is a schematic diagram of a transmission performed by a device simultaneous in beam directions in which a channel is detected to be clear. The device performs the transmission on five consecutive resources and each resource corresponds to a different beam direction, where beam directions are labeled beam #1, beam #2, beam #3, beam #4, and beam #5 in sequence. The base station/UE performs the clear channel detection by using LBT based on multiple beams before performing the transmission on the consecutive transmission resources. If the beam directions in which the channel is detected to be clear are beam #2, beam #3, and beam #4, the base station/UE performs the transmission in these three beam directions on the first resource and performs the transmission using beam #2 and beam #3 on the second resource. In an embodiment, there are two cases. In the first case, the transmission is performed on the third resource by using beam #3. Before performing the transmission on the fourth resource, the device may perform the LBT mechanism on beam #1 and/or beam #5. If it is detected that the channel is clear in at least one beam direction, the device performs the transmission in the at least one beam direction. The transmission is performed on the fifth resource in a beam direction in which the channel is detected to be clear and that is not previously used. Alternatively, before performing the transmission on the fourth resource, the device may perform the LBT mechanism on at least one of beam #1 to beam #5 and perform the transmission on a subsequent resource in a beam direction in which the channel is detected to be clear. The transmission is performed on a next resource in a beam direction that is not used by the previous resource. In the second case, the base station/UE may perform the LBT mechanism on beam #1 and/or beam #3 and/or beam #5 before performing the transmission on the third resource. If the channel is detected to be clear in a beam direction, the transmission is performed on the third resource in the beam direction in which the channel is detected to be clear, and/or the transmission is performed in the direction beam #3 corresponding to the third resource. The transmission is performed on a next resource in the beam direction that is not used by the previous resource. In the same manner, if the number of beam directions for the transmission on the current resource is not greater than 2 and the current resource is not a penultimate resource for the continuous transmission, processing is performed in the manner in the second case.

An embodiment of the present disclosure provides a processing manner in the case where the channel is detected to be busy.

If the base station/UE detects that the channel is busy, the base station/UE may perform an operation in at least one of manners one to fourteen described below.

In the case of time domain+LBT+(unchanged beam direction in frequency domain and spatial domain), at least one of manners one to three is used.

Manner one: the clear channel detection is performed by using a previous LBT mechanism before a next candidate start position.

Manner two: a simplified LBT mechanism of the previous LBT mechanism or the fast LBT mechanism is used before the next candidate start position.

Manner three: different from manner one and manner two, the next candidate start position is changed to a next resource.

In an embodiment, a previous beam direction may be used, or a previous LBT mode may be used, or the LBT mechanism may be performed only in a beam direction for the transmission in manners one to three.

In the case of frequency domain+LBT (unchanged beam direction), at least one of manners four to six is used.

Manner four: the transmission is performed in a switched frequency domain in which the channel is detected to be clear.

Manner five: the clear channel detection is performed by using the previous LBT mechanism in another switched frequency domain.

Manner six: the simplified LBT mechanism of the previous LBT mechanism or the fast LBT mechanism is used in another switched frequency domain.

In the case of spatial domain+LBT (unchanged beam direction), at least one of manners seven to fourteen is used.

Manner seven: the transmission is performed in a switched beam direction in which the channel is detected to be clear.

Manner eight: the beam direction is switched, and the previous LBT mechanism is used in the switched beam direction.

Manner nine: the beam direction is switched, and the simplified LBT mechanism of the previous LBT mechanism or the fast LBT mechanism is used in the switched beam direction.

Manner ten: the LBT mechanism continues to be performed until the LBT is successfully performed.

Manner eleven: the previous LBT mechanism is used in multiple beam directions.

Manner twelve: the simplified LBT mechanism of the previous LBT mechanism or the fast LBT mechanism is used in multiple beam directions.

Manner thirteen: it is determined whether currently detected energy is greater than a first detection threshold and less than a second detection threshold, or it is determined whether the currently detected energy is less than the second detection threshold. If yes, it is considered that a current channel is clear and the device may perform the transmission.

Manner fourteen: a combination of at least one of the preceding manners is used.

In an embodiment, if a partial symbol or a partial (mini-) slot or a partial subframe exists, the device may send data, an occupancy signal, a reference signal, an indication signal, or the like on the partial symbol or the partial (mini-)slot or the partial subframe.

In an embodiment, if the number of times indicating that the channel is busy when the previous LBT mechanism is performed is greater than or equal to a first preset number, the simplified LBT mechanism of the previous LBT mechanism or the fast LBT mechanism is used.

The first preset number may be determined according to a statistics result, a predefined manner, a physical layer DCI signaling indication, a higher layer RRC signaling indication, or a MAC signaling indication.

The switched frequency domain is a frequency domain in which the channel is detected to be clear. The frequency domain may be a Resource Block (RB), a Resource Block Group (RBG), a Resource Element (RE), a Resource Element Group (REG), a Bandwidth Part (BWP), a Component Carrier (CC), a subband, a Common Channel Group (CCG), or a subband group.

The simplified LBT mechanism of the previous LBT mechanism is a simplified LBT mechanism relative to the previous LBT mechanism from the perspective of at least one of a parameter configuration in the LBT mechanism, a priority corresponding to the LBT mechanism, a detection duration corresponding to a parameter, a Subcarrier Spacing (SCS), the LBT mechanism, or the number of times the LBT mechanism is performed. The fast LBT mechanism may be one of a Cat2 LBT mechanism, performing a Cat2 LBT mechanism M times, a Cat4 LBT mechanism with a random backoff value of N (containing no defer period), a Cat4 LBT mechanism with a random backoff value of N (containing the defer period), an LBT mechanism with a duration of a defer period, or an LBT mechanism obtained by scaling the preceding LBT mechanism according to the SCS.

For example, if the Cat4 LBT is used previously, a Cat4 LBT mechanism with a higher priority, a Cat4 LBT mechanism with a lower contention window/a random backoff value of N, the Cat2 LBT mechanism, performing the Cat2 LBT mechanism M times, the Cat4 LBT mechanism with the random backoff value of N (containing no defer period), the Cat4 LBT mechanism with the random backoff value of N (containing the defer period), the LBT mechanism with the duration of the defer period, or the LBT mechanism obtained by scaling the preceding LBT mechanism according to the SCS may be used currently. In another example, if the Cat2 LBT is used previously, a Cat2 LBT mechanism with a shorter detection time than the previous Cat2 LBT mechanism, performing the Cat2 LBT mechanism M times, or the like may be used currently.

An embodiment of the present disclosure provides a channel access manner in the case where a base station/terminal (UE) initiates a Maximum Channel Occupancy Time (MCOT)/Transmission Opportunity (TxOP).

The base station/UE needs to perform a Category 4 Listen Before Talk (Cat4 LBT) mechanism to initiate one MCOT/TxOP. The Cat4 LBT mechanism may be an omnidirectional Cat4 LBT mechanism, a Cat4 LBT mechanism in multiple beam directions, a Cat4 LBT mechanism in a wide beam direction, or Cat4 LBT in a single beam direction. The Cat4 LBT mechanism may be one of a Cat4 LBT mechanism with a relatively high priority, a Cat3 LBT mechanism, a Cat4 LBT mechanism with a random backoff value of N (containing no defer period), a Cat4 LBT mechanism with a random backoff value of N (containing the defer period), performing a Cat2 LBT mechanism M times, a Cat2 LBT mechanism, an LBT mechanism with a duration of a defer period, or an LBT mechanism obtained by scaling the preceding LBT mechanism according to an SCS.

Before the UE/base station performs the transmission within the MCOT, the channel access manner performed by the UE/base station includes at least one of manners one to nine described below.

Manner one: if a gap between downlink and uplink or a gap between uplink and downlink is not greater than a first threshold, the base station/UE may not perform LBT or a clear channel detection. In an embodiment, the first threshold may be one of positive integers between 9 us and 43 us.

The first threshold is acquired by at least one of a predefined manner, a physical layer DCI signaling indication, a higher layer RRC signaling indication, or a MAC signaling indication.

Manner two: if a gap between downlink and uplink or a gap between uplink and downlink is less than a second threshold or is not less than a first threshold and not greater than a second threshold, the base station/UE may perform the Cat2 LBT mechanism or perform the Cat2 LBT mechanism M times.

The first threshold or the second threshold is acquired by at least one of a predefined manner, a physical layer DCI signaling indication, a higher layer RRC signaling indication, or a MAC signaling indication.

Manner three: at a switching point from downlink to uplink or a switching point from uplink to downlink, the base station/UE performs the Cat2 LBT mechanism or performs Cat2 LBT M times before performing a downlink/uplink transmission.

Manner four: at a switching point from downlink to uplink or a switching point from uplink to downlink, before performing a downlink/uplink transmission, the base station/UE uses an LBT mechanism which is the same as an LBT mechanism used when the base station/UE initiates the MCOT. The LBT mode may be the same or different.

For example, the base station initiates the MCOT and uses the Cat4 LBT. After the uplink transmission and before the downlink transmission within the MCOT, an LBT mechanism used by the base station for the downlink transmission may be the Cat4 LBT mechanism used when the base station initiates the MCOT.

Manner five: at a switching point, before performing a downlink/uplink transmission, the base station/UE uses an LBT mechanism which has a higher priority than an LBT mechanism used when the base station/UE initiates the MCOT. The LBT mode may be the same or different.

For example, the base station initiates the MCOT and uses the Cat4 LBT with a priority of 3. After the uplink transmission and before the downlink transmission within the MCOT, an LBT mechanism used by the base station for the downlink transmission may be the Cat4 LBT mechanism with a priority of 2 or 1. Priority 1>priority 2>priority 3, and so on.

Manner six: before performing a downlink/uplink transmission within the MCOT, the base station/UE performs an LBT mechanism and/or mode related to beam information and/or a duration of the downlink transmission or the uplink transmission.

For example, if a remaining duration or a proportion of the MCOT occupied by the downlink transmission after the uplink transmission within the MCOT is greater than or equal to a third preset threshold, the Cat4 LBT mechanism with a relatively high priority, the Cat3 LBT mechanism, the Cat4 LBT mechanism with the random backoff value of N (containing no defer period), the Cat4 LBT mechanism with the random backoff value of N (containing the defer period), performing the Cat2 LBT mechanism M times, the Cat2 LBT mechanism, the LBT mechanism with the duration of the defer period, or the LBT mechanism obtained by scaling the preceding LBT mechanism according to the SCS is used. On the contrary, if the remaining duration or the proportion of the MCOT occupied by the downlink transmission is not greater than the third preset threshold, LBT is not performed, or the Cat2 LBT mechanism is used, or the Cat2 LBT mechanism is performed M times, or the LBT mechanism obtained by scaling the preceding LBT mechanism according to the SCS is used.

Manner seven: within the MCOT, LBT used by the base station/UE for a downlink/uplink transmission is related to the number of switching points/an index within the MCOT.

In an embodiment, if the number of switching points or the index is greater or it is closer to an end position of the MCOT, a more adequate clear channel assessment mechanism may be used, such as the Cat4 LBT mechanism, the Cat4 LBT mechanism with a relatively high priority, the Cat3 LBT mechanism, the Cat4 LBT mechanism with the random backoff value of N (containing no defer period), the Cat4 LBT mechanism with the random backoff value of N (containing the defer period), performing the Cat2 LBT mechanism M times, the Cat2 LBT mechanism, the LBT mechanism with the duration of the defer period, or the LBT mechanism obtained by scaling the preceding LBT mechanism according to the SCS.

In an embodiment, if the base station/UE still has data/channels/signals to transmit or the transmission of data/channels/signals does not end at the end moment of the MCOT, the base station/UE may perform the transmission outside the MCOT according to a transmission manner and/or an LBT mechanism and/or an LBT mode used for the continuous transmission. Alternatively, the fast LBT mechanism, the Cat4 LBT mechanism, the Cat4 LBT mechanism with a relatively high priority, the Cat3 LBT mechanism, the Cat4 LBT mechanism with the random backoff value of N (containing no defer period), the Cat4 LBT mechanism with the random backoff value of N (containing the defer period), performing the Cat2 LBT mechanism M times, the Cat2 LBT mechanism, the LBT mechanism with the duration of the defer period, or the LBT mechanism obtained by scaling the preceding LBT mechanism according to the SCS is performed.

In an embodiment, a device performs the Cat2 LBT mechanism or a simplified Cat2 LBT mechanism or the Cat2 LBT mechanism M times at the switching point within the MCOT. When the number of times the Cat2 LBT mechanism is performed exceeds a particular threshold or when the number of switching points within the MCOT is greater than the particular threshold, the base station or the UE may use the Cat2 LBT mechanism M times, the Cat4 LBT mechanism with a relatively high priority, the Cat3 LBT mechanism, the Cat4 LBT mechanism with the random backoff value of N (containing no defer period), the Cat4 LBT mechanism with the random backoff value of N (containing the defer period), performing the Cat2 LBT mechanism M times, the Cat2 LBT mechanism, the LBT mechanism with the duration of the defer period, or the LBT mechanism obtained by scaling the preceding LBT mechanism according to the SCS.

In an embodiment, if the number of times a non-Cat2 LBT mechanism is performed exceeds a particular threshold, the base station or the UE may use the Cat2 LBT mechanism or perform the Cat2 LBT mechanism M times.

The particular threshold may be acquired by at least one of a predefined manner, a higher layer RRC signaling indication, or a physical layer DCI signaling indication.

Manner eight: within the MCOT, an LBT mechanism used by the base station/UE for a downlink/uplink transmission is related to a currently transmitted time domain/subframe/slot structure.

For example, for a downlink-dominant transmission structure, the UE may perform no LBT mechanism, or perform the Cat2 LBT mechanism M times, or the Cat2 LBT mechanism, or the LBT mechanism with the duration of the defer period, or the LBT mechanism obtained by scaling the preceding LBT mechanism according to the SCS before performing a transmission on an uplink part in the downlink-dominant transmission structure. Alternatively, the base station may perform an LBT mechanism in multiple beam directions or an LBT mechanism in a single beam direction before a downlink-dominant structure. The LBT mechanism may be the Cat4 LBT mechanism with a relatively high priority, the Cat3 LBT mechanism, the Cat4 LBT mechanism with the random backoff value of N (containing no defer period), the Cat4 LBT mechanism with the random backoff value of N (containing the defer period), performing the Cat2 LBT mechanism M times, the Cat2 LBT mechanism, the LBT mechanism with the duration of the defer period, or the LBT mechanism obtained by scaling the preceding LBT mechanism according to the SCS.

Manner nine: within the MCOT, an LBT mechanism used by the base station/UE for a downlink/uplink transmission is related to a priority of a channel/signal transmitted by the base station/UE. For a channel/signal with a high priority, a simplified or fast LBT mechanism is used or no LBT mechanism is performed.

Figure 8:
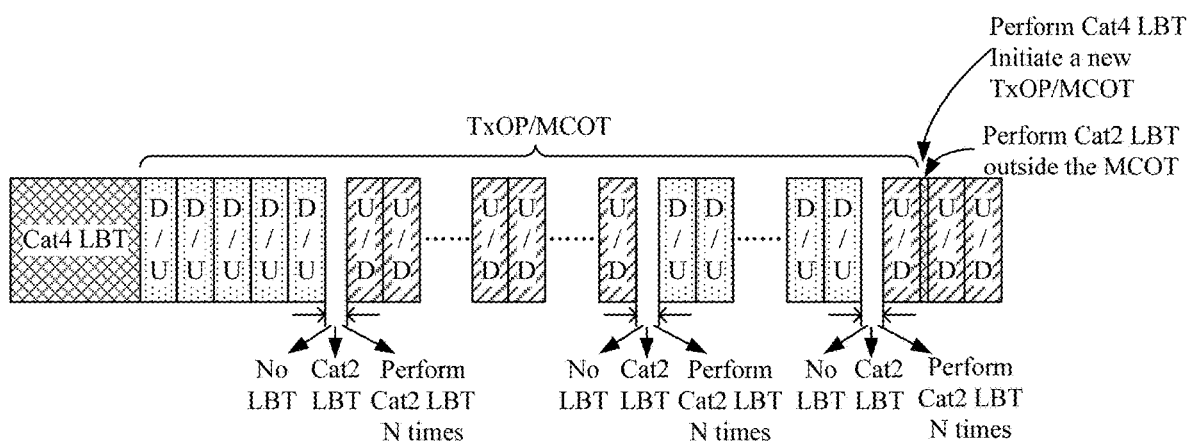
FIG. 8 is a schematic diagram of a channel access mechanism in the case where there are multiple switching points within an MCOT according to an embodiment of the present disclosure.

In a typical example of a channel access in the case where there are multiple switching points within the MCOT, as shown in FIG. 8, FIG. 8 is a schematic diagram one of a channel access mechanism in the case where there are multiple switching points within an MCOT. The base station/UE performs the Cat4 LBT mechanism before initiating one MCOT. If a gap at the switching point from downlink to uplink or the switching point from uplink to downlink within the MCOT is less than or equal to the first threshold, the UE/base station may not perform LBT. If the gap at the switching point is between the first threshold and the second threshold or is less than or equal to the second threshold, the base station/UE may perform the Cat2 LBT mechanism or perform the Cat2 LBT M times. An LBT mode used by the base station/UE at the switching point may be a default mode or a mode indicated via dynamic signaling. If the base station/UE has not completed the transmission within the MCOT, generally, the base station/UE needs to perform the Cat4 LBT mechanism outside the MCOT. To increase the probability of a channel access of the base station/UE, the base station/UE may perform the Cat2 LBT mechanism or perform the Cat2 LBT mechanism M times. In an embodiment, the LBT mechanism may be performed based on a single beam direction or simultaneously performed based on multiple beam directions, or the LBT mechanism is performed in a single beam direction or in multiple beam directions on another BWP/subband. In an embodiment, the LBT mechanism outside the MCOT may be notified or indicated via dynamic signaling within a previous MCOT or may be used in a default manner.

In an embodiment, at least one of a transmission structure within the MCOT, the number of switching points, a start position of the switching point, an end position of the switching point, a duration of the switching point, the number of times the Cat2 LBT mechanism is performed, or M may be pre-configured or notified to the base station/UE via physical layer dynamic signaling. The number of switching points, the number of times Cat2 LBT is performed, or M may also be determined according to a duration of the MCOT/TxOP, a duration of a gap allowed within the MCOT, the number of scheduling units/a structure of a scheduling unit, or the SCS. The transmission structure refers to a time domain transmission structure constituted by an uplink/downlink end position/a set of uplink/downlink end positions and/or an uplink/downlink start position/a set of uplink/downlink start positions and/or the SCS and/or an uplink/downlink attribute of each part and/or a subframe/slot structure within the MCOT. The transmission structure within the MCOT may be shared between base stations and/or between UEs and/or among the base stations and the UEs.

A CCA detection duration of the Cat2 LBT mentioned above may be one of positive integers within [1 us, 43 us]. Performing the Cat2 LBT M times may represent performing the Cat2 LBT mechanism M times or performing the Cat2 LBT mechanism M times with one LBT success.

If the base station/UE performs the LBT mechanism and detects that a current channel is clear, the base station/UE initiates the MCOT. For a downlink/uplink transmission manner and/or the LBT mechanism at the beginning of the MCOT, reference is made to the channel access manner in the case of the continuous downlink/uplink transmission in the preceding embodiments and/or the processing manners in the case where the channel is detected to be busy in the preceding embodiment.

A beam direction in which the base station/UE performs the transmission may be determined according to an LBT result. The base station/UE may perform the transmission only in a beam direction in which the channel is detected to be clear.

An embodiment of the present disclosure provides a channel access manner in the case where a UE initiates an MCOT/TxOP.

In the case where the UE initiates the MCOT, the UE uses the Cat4 LBT mechanism at the beginning of the MCOT. The LBT mode may be an omnidirectional Cat4 LBT mechanism, a Cat4 LBT mechanism in multiple beam directions, a Cat4 LBT mechanism in a wide beam direction, or a Cat4 LBT mechanism in a single beam direction.

Figure 9:
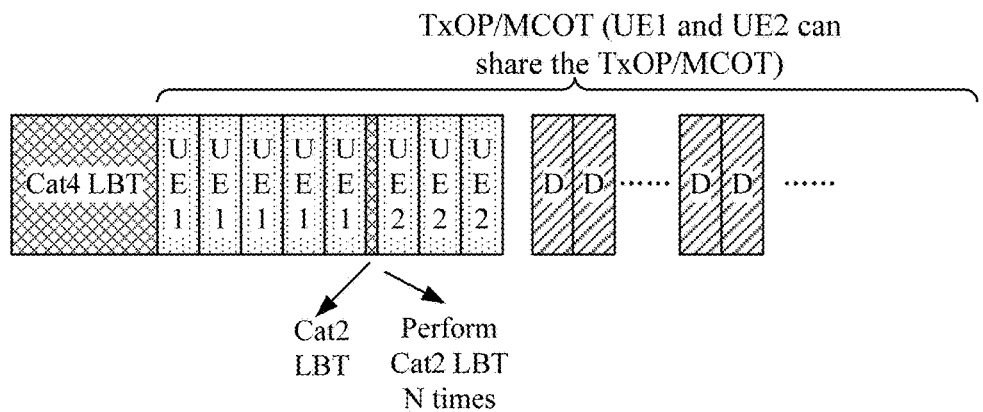
FIG. 9 is schematic diagram one of a channel access in the case where different UEs share one MCOT according to an embodiment of the present disclosure.

If different UEs may share the same MCOT, the UE may perform a Cat2 LBT mechanism or perform the Cat2 LBT mechanism M times before performing an uplink transmission within the shared MCOT. As shown in FIG. 9, FIG. 9 is schematic diagram one of a channel access in the case where different UEs share one MCOT. The UE may perform a Cat4 LBT mechanism with a relatively high priority, a Cat3 LBT mechanism, a Cat4 LBT mechanism with a random backoff value of N (containing no defer period), a Cat4 LBT mechanism with a random backoff value of N (containing a defer period), the Cat2 LBT mechanism M times, or the Cat2 LBT mechanism, an LBT mechanism with a duration of the defer period, or an LBT mechanism obtained by scaling the preceding LBT mechanism according to an SCS before the uplink transmission. The LBT mechanism and/or the LBT mode and/or an LBT detection position performed by a sharer UE within the MCOT may be acquired in a predefined manner and/or indicated via physical layer DCI signaling and/or indicated via higher layer RRC signaling.

In an embodiment, UEs that share the MCOT may determine whether an MCOT of an initiator UE may be shared through a CCA detection pattern and/or a beam direction/beam information and/or a channel/signal identification. For example, UEs that share the MCOT are configured with the same CCA detection pattern such as not sending/being empty/being blank at an even/odd resource position in frequency domain and sending a signal at an odd/even resource position. In another example, the CCA detection pattern may use a comb structure of a Sounding Reference Signal (SRS). If a UE sharing the MCOT detects that a channel is clear on an even/odd frequency domain resource, the channel is considered available or the MCOT can be shared. Alternatively, if a UE sharing the MCOT detects that the channel is clear on an even/odd frequency domain resource and detects that the channel is busy/clear on an odd/even resource, the channel is considered available or the MCOT can be shared. Further, the UEs that share the MCOT may share at least one of the following information within the MCOT, including a start position and an end position of an uplink transmission, the CCA detection pattern, a CCA detection position, or the SCS. In another example, the UEs that share the MCOT share information such as a beam direction for the uplink transmission so that a UE sharing the MCOT initiated by another UE may identify whether the current MCOT is initiated by the sharer UE. This manner is also applicable to base stations that share an MCOT. In response to an identification failure, the UE needs to perform the Cat4 LBT mechanism to initiate a new MCOT.

Figure 10:
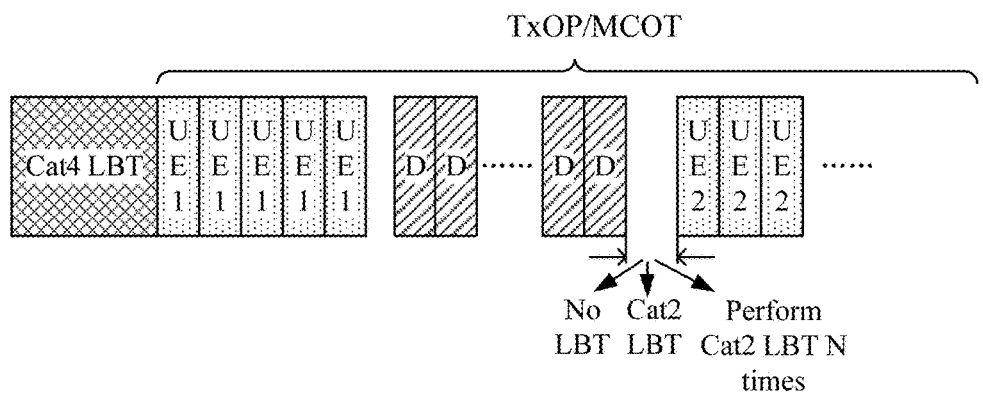
FIG. 10 is schematic diagram two of a channel access in the case where different UEs share one MCOT according to an embodiment of the present disclosure.

Different from FIG. 9, FIG. 10 is schematic diagram two of a channel access in the case where different UEs share one MCOT. A first-type UE performs the Cat4 LBT mechanism before the MCOT starts. If a channel is detected to be clear, one MCOT is initiated. Within the MCOT, the LBT mechanism, and/or the LBT mode and/or the LBT detection position and/or the SCS performed by the UE at an odd/even switching point may be indicated by the base station to the UE via the physical layer DCI signaling. In an embodiment, the UE performs the channel access in an LBT manner used for the transmission within the MCOT, for example, no LBT is performed, or the Cat2 LBT is performed, or the LBT mechanism is performed M times.

Figure 11:
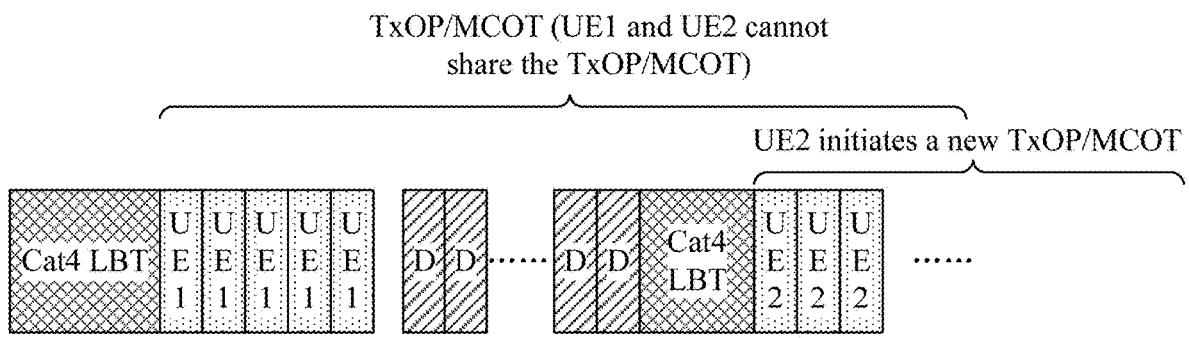
FIG. 11 is schematic diagram one of a channel access in the case where different UEs cannot share one MCOT according to an embodiment of the present disclosure.

If different UEs cannot share the same MCOT, the channel access manner in FIG. 11 may be used. As shown in FIG. 11, FIG. 11 is schematic diagram one of a channel access in the case where different UEs cannot share one MCOT. The UEs that cannot share one MCOT refer to UEs that have no information transfer with a base station before transmissions on scheduling resources within the MCOT. In an embodiment, a UE performs the channel access by using the Cat4 LBT mechanism before performing a transmission. If the channel is detected to be clear, the UE (labeled UE1 or the first-type UE) initiates one MCOT. After uplink and before downlink within the MCOT initiated by the UE, if a gap between the uplink and the downlink is less than or equal to a first threshold, the base station may not perform LBT. If the gap after the uplink and before the downlink is between the first threshold and a second threshold or is not less than the second threshold, the base station may perform the Cat2 LBT mechanism or perform the Cat2 LBT M times. Further, another UE (for example, UE2 or a second-type UE or a UE that cannot share the MCOT initiated by UE1 or the first-type UE) is scheduled within the MCOT initiated by UE1 or the first-type UE. At this time, the UE may perform the Cat4

LBT mechanism or the Cat4 LBT mechanism with a high priority. If the channel is detected to be clear, the UE initiates a new MCOT. If the UE (for example, UE2 or the second-type UE or the UE that cannot share the MCOT initiated by UE1 or the first-type UE) receives an LBT mechanism and/or an LBT mode and/or an LBT position and/or indication information for sharing the MCOT and/or beam information and/or MCOT information notified by the base station, the UE may not perform the Cat4 LBT mechanism or perform the Cat2 LBT mechanism, the Cat2 LBT mechanism M times, or the Cat4 LBT mechanism. In an embodiment, the UE uses the Cat4 LBT mechanism with a high priority, and/or the UE does not re-initiate one MCOT.

Figure 12:
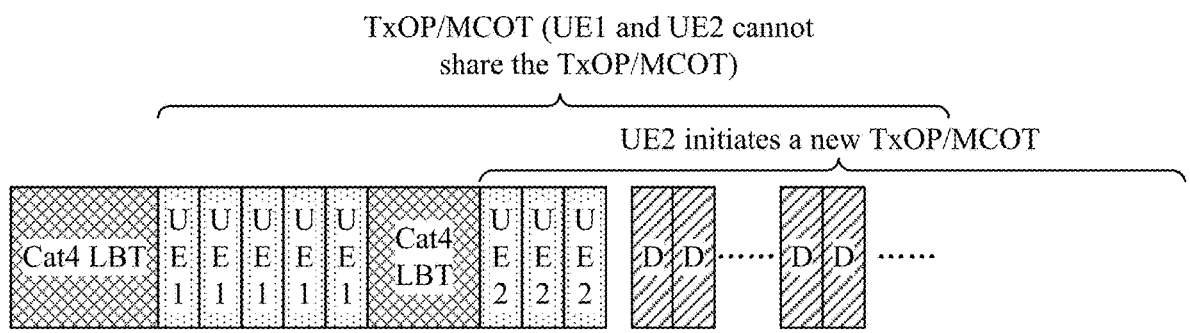
FIG. 12 is schematic diagram two of a channel access in the case where different UEs cannot share one MCOT according to an embodiment of the present disclosure.

If different UEs cannot share the same MCOT, the channel access manner in FIG. 12 may also be used. As shown in FIG. 12, FIG. 12 is schematic diagram two of a channel access in the case where different UEs cannot share one MCOT. If UE1 succeeds in performing the Cat4 LBT mechanism before the transmission, UE1 initiates one MCOT/TxOP. If UE2 performs a clear channel assessment during the time UE1 occupying the channel and determines that the channel is currently clear, UE2 may initiate a new MCOT/TxOP. In this case, if UE2 and UE1 use different beams on an overlapping resource or interference in a beam direction is within an allowable range, UE2 and UE1 may perform transmissions within respective MCOTs/TxOPs initiated by UE2 and UE1. If the channel is preempted by UE2 during the MCOT/TxOP of UE1, UE1 abandons the transmission within the current MCOT/TxOP, or UE1 and a device that shares the MCOT/TxOP with UE1 may attempt to continue a channel access at a candidate transmission opportunity within the MCOT/TxOP. In general, UE2 needs to perform an LBT mechanism to initiate a new MCOT/TxOP. In an embodiment, UE2 may perform the Cat4 LBT mechanism with a relatively high priority, the Cat3 LBT mechanism, the Cat4 LBT mechanism with the random backoff value of N (containing no defer period), the Cat4 LBT mechanism with the random backoff value of N (containing the defer period), the Cat2 LBT mechanism M times, the Cat2 LBT mechanism, the LBT mechanism with the duration of the defer period, or the LBT mechanism obtained by scaling the preceding LBT mechanism according to the SCS. In an embodiment, the used LBT mode may be an LBT mode in a single beam direction, an LBT mode in multiple beam directions, or the like.

An embodiment of the present disclosure provides a channel access manner on different BWPs/subbands. A device may be a base station or a terminal (UE).

A BWP/subband used for the transmission of the device is determined according to an LBT result. The device may perform an LBT mechanism on each BWP/subband or may perform LBT on a bandwidth corresponding to the BWP/subband. The LBT may be an omnidirectional LBT mechanism, an LBT mechanism in a single beam direction, or an LBT mechanism in multiple beam directions.

When the device uses the omnidirectional LBT mechanism on different BWPs/subbands, if the device detects that a channel is clear on L BWPs/subbands, the device may perform the transmission on at least one of the L BWPs/subbands. If the channel is detected to be busy on a BWP/subband among the L BWPs/subbands, the transmission is abandoned on the BWP/subband on which the channel is currently detected to be busy. Further, the LBT mechanism continues to be performed before a next candidate start position.

When the device uses the LBT mechanism in a single beam direction on different BWPs/subbands, if the device detects that the channel is clear in a beam direction corresponding to the L BWPs/subbands, the device may perform the transmission in the beam direction on the BWPs/subbands on which the channel is detected to be clear. On the contrary, if the channel is detected to be busy in the beam direction corresponding to the L BWPs/subbands, the device abandons the transmission in the beam direction corresponding to the BWPs/subbands on which the channel is currently detected to be busy. In an embodiment, the device may switch the beam direction or perform the LBT mechanism simultaneously in multiple beam directions. If the channel is detected to be clear in the switched beam direction, the BWP/subband is considered available currently.

When the device uses the LBT mechanism in multiple beam directions on different BWPs/subbands, if the number of beam directions in which the channel is detected by the device to be clear on the L BWPs/subbands is not less than 1, the device may perform the transmission simultaneously in the beam directions in which the channel is detected to be clear on the BWPs or perform the transmission in at least one of the beam directions in which the channel is detected to be clear on the BWPs. In an embodiment, in the case where the channel is detected to be clear in the multiple beam directions, the device selects a beam direction with minimum interference from beams to perform the transmission.

For a next resource, the device may perform the LBT mechanism in the preceding manner on a currently activated BWP/subband. Alternatively, the device may perform the LBT mechanism in the preceding manner on the configured L BWPs/subbands.

For a processing manner when the channel is detected to be busy on different BWPs/subbands, reference may be made to the processing manner in the case where the channel is detected to be busy in the preceding embodiments.

Figure 13:
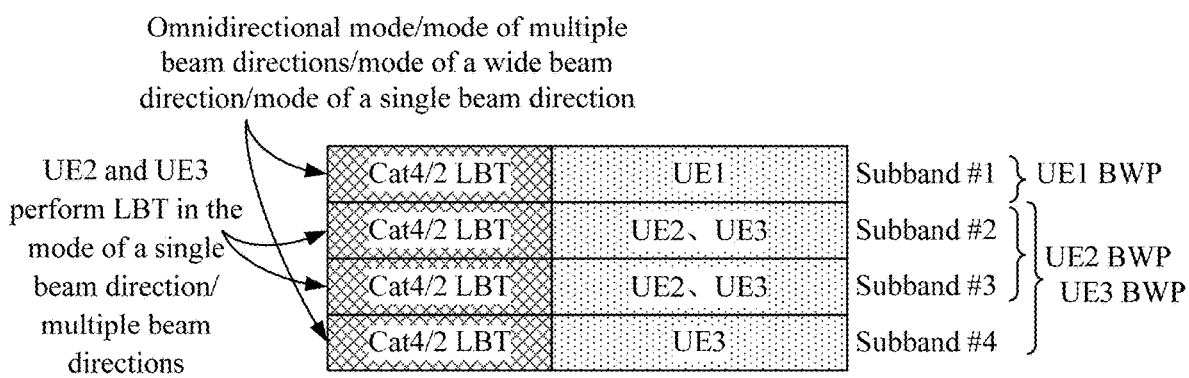
FIG. 13 is a schematic diagram of an LBT manner based on a BWP/subband according to an embodiment of the present disclosure.

For example, it is assumed that a transmission bandwidth of UE1 is labeled subband #1 and may also be labeled BWP #1, a transmission bandwidth of UE2 is labeled subband #2 and subband #3 and may also be labeled BWP #2, and a transmission bandwidth of UE3 is labeled subband #2, subband #3, and subband #4 and may also be labeled BWP #3. As shown in FIG. 13, FIG. 13 is a schematic diagram of an LBT manner based on a BWP/subband. The subband, a subband LBT mechanism, a subband LBT mode, a beam direction, a start moment of LBT, an LBT position may be determined by at least one of a predefinition, physical layer DCI signaling, higher layer RRC signaling, or MAC signaling. UE1 may perform the LBT mechanism on subband #1 in an omnidirectional mode or in a mode of a single beam direction, multiple beam directions, or a wide beam direction. If UE1 detects that the channel is clear, UE1 may perform the transmission on subband #1. On the contrary, reference may be made to the processing manner in the case where the channel is detected to be busy in the preceding embodiments. UE2 may perform multi-subband LBT simultaneously on subband #2 and subband #3. Different beam directions or the same beam direction may be used on each subband. UE2 may perform LBT detection in a beam direction configured for each subband or perform the LBT mechanism in multiple beam directions. UE2 performs the transmission only in a direction corresponding to a beam on which the channel is detected to be clear. When UE2 performs the LBT mechanism in multiple beam directions, if the channel is detected to be clear in only one beam direction, the one beam direction is used as the beam direction for the current transmission. UE2 performs no transmission in a beam direction in which it is not detected that the channel is clear. If the number of beam directions in which the channel is detected to be clear is not less than 1, the UE may perform the transmission in multiple beam directions in which the channel is detected to be clear or perform the transmission in s beam directions with the best channel conditions among beams on which the channel is detected to be clear. s is a positive integer greater than or equal to 1. A processing process of UE3 is the same as that of UE2. Further, if UE2 or UE3 fails to perform LBT on a subband of the configured subbands, UE2 or UE3 may perform the transmission only on a subband where LBT is performed successfully. For processing when the UE fails to perform LBT, reference may be made to the processing manner in the case where the channel is detected to be busy in the preceding embodiments.

In the case where the UE initiates the MCOT, the UE performs the channel access outside or before the MCOT in at least one of manners one to five described below.

Manner one: the Cat4 LBT for a BWP is performed.

Manner two: the UE performs the Cat4 LBT mechanism for the subband on each subband.

Manner three: the UE uses a Cat4 LBT mechanism for the subband and with a priority A on one subband and uses a Cat4 LBT mechanism for the subband and with a priority higher than priority A on another subband.

Manner four: the UE uses the Cat4 LBT mechanism for the subband on one subband and uses an LBT mechanism for the subband and with a duration of a defer period on another subband.

Manner five: the LBT manner for multiple carriers standardized in LAA is multiplexed, that is, the Cat4 LBT is used on one carrier and the Cat2 LBT mechanism is used on other carriers.

In the preceding manners, different LBT modes or the same LBT mode may be used on a BWP or different subbands. For manner two, on different subbands, the same contention window size (or the same random backoff value of N) may be configured, and/or the same priority is used, and/or a relatively small random backoff value/backoff window is configured for a subband with a poor channel condition. The one subband in manner three and manner four may be determined by at least one of a predefinition, a carrier selection, a physical layer DCI signaling indication, a higher layer RRC signaling indication, or a MAC layer signaling indication.

If BWPs of different UEs overlap, the different UEs may perform the Cat4 LBT mechanism on their respective BWPs. To implement spatial multiplexing/reuse between different UEs, the different UEs may use the Cat4 LBT mechanism for the BWP and based on a beam direction if the different UEs perform transmissions in beam directions.

In an embodiment, different UEs may perform multi-subband LBT on their respective subbands. For the LBT of one UE with multiple subbands, reference may be made to the corresponding manner in the present disclosure. Similarly, in the case where different UEs are on the same subband, if the different UEs perform the transmissions in different beam directions, the different UEs may simultaneously perform LBT mechanisms in their respective beam directions or in multiple beam directions, thereby improving the probability of the channel access and being conducive to an implementation of the spatial multiplexing/reuse. For a specific spatial multiplexing/reuse method, reference is made to the embodiments described below.

Similarly, the UE may use the Cat2 LBT mechanism or perform the Cat2 LBT mechanism M times within the MCOT.

An embodiment of the present disclosure further provides a spatial multiplexing/reuse manner. In one manner, the spatial multiplexing/reuse mainly focuses on a manner in which devices perform transmissions in different beam directions at the same time moment. The devices include base stations and/or terminals (UEs).

Assuming that device 1 uses beam index #1 for a transmission, device 1 performs an LBT mechanism to determine a current busy/clear condition of a channel before the transmission. If the channel is detected to be clear, device 1 performs the transmission using beam index #1. To improve the spatial multiplexing/reuse efficiency/factor, it is expected that another device may perform a transmission using another beam index while device 1 performs the transmission using beam index #1.

If a system supports spatial multiplexing/reuse between different devices, different beam indexes are configured for the different devices at the same time moment. For spatial multiplexing/reuse between base stations, information needs to be exchanged between the base stations before transmissions. The exchanged information is at least one of: beam index information, time domain resource information (such as a time domain pattern), frequency domain resource information, an SCS, a transmission structure of an MCOT, a subframe/slot structure, an LBT mechanism, an LBT position, or an LBT mode. For spatial multiplexing/reuse between UEs, a base station may notify the UEs of transmission beam index information, the time domain resource information (such as the time domain pattern), the frequency domain resource information, the SCS, the transmission structure of the MCOT, and the subframe/slot structure via at least one of physical layer DCI signaling, higher layer RRC signaling, or MAC layer signaling. Alternatively, beam index information between different base stations/UEs is pre-configured.

Based on the preceding manner, the base station/UE performs the LBT mechanism in a beam direction before the transmission. If it is detected that a channel is clear in the beam direction, the base station/UE performs the transmission in the beam direction.

In an embodiment, if base stations/UEs perform no information exchange before transmissions, the base stations/UEs may perform LBT mechanisms in corresponding beam directions or may perform LBT mechanisms simultaneously in multiple beam directions before the transmissions. The base stations/UEs may perform the transmissions in beam directions in which the channel is detected to be clear. Alternatively, the transmissions are performed in beam directions in which the channel is detected to be clear and that have minimum interference. The devices for multiplexing may each perform the Cat2 LBT mechanism or perform the Cat2 LBT mechanism M times. The devices for multiplexing may also perform the Cat4 LBT mechanism.

If the same beam direction is configured for different base stations/UEs, to increase the spatial reuse factor, it is considered that the base stations/UEs detect that the channel is clear when the base stations/UEs detect that an interference level or energy is greater than or equal to a first detection threshold and less than or equal to a second detection threshold in the beam direction.

Figure 14:
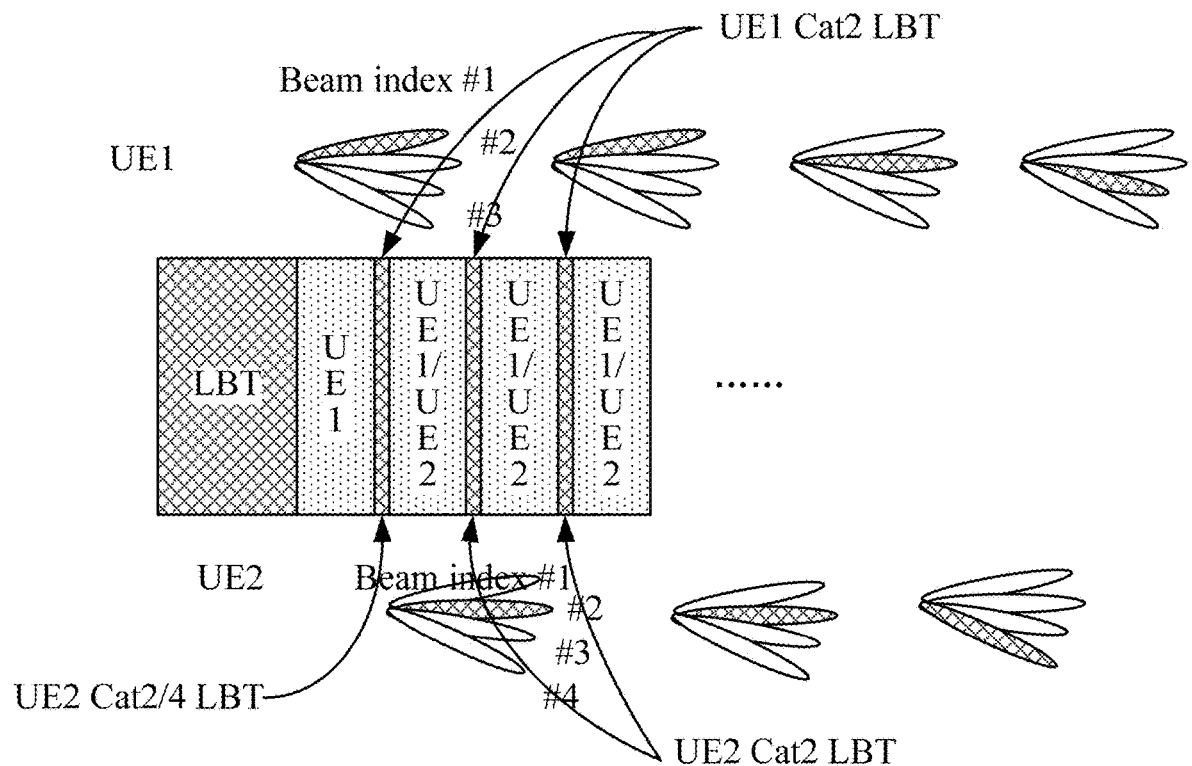
FIG. 14 is a schematic diagram of spatial multiplexing/reuse between different UEs according to an embodiment of the present disclosure.

A multiplexing manner between devices in the case of no information exchange is illustrated by way of example. As shown in FIG. 14, FIG. 14 is a schematic diagram of spatial multiplexing/reuse between different UEs. It is assumed that UE1 is scheduled on resource #1, resource #2, resource #3, and resource #4 on which beam directions, index #1, index #1, index #2, and index #3, are used in sequence. UE2 is scheduled on resource #2, resource #3, and resource #4 on which beam directions, index #2, index #2, and index #4, are used in sequence. If UE1 performs LBT to detect that a channel is clear before a transmission, the transmission is performed using beam index #1 on resource #1. In general, before performing the transmission on resource #2, UE1 may perform no LBT and directly perform the transmission in the beam direction corresponding to beam #1. UE1 may perform a fast LBT mechanism before performing the transmission on resource #2. UE1 reserves or empties time domain and/or frequency domain resources for performing an LBT mechanism, which also facilitates the clear channel assessment of the UE for the spatial multiplexing. Before performing a transmission on resource #2, UE2 needs to perform an LBT mechanism to determine whether the channel is clear in a direction of beam index #2. UE2 may perform the fast LBT mechanism, such as the Cat2 LBT mechanism or performing the Cat2 LBT mechanism M times. In an embodiment, in the case where UE1 and UE2 cannot share one MCOT, UE2 needs to perform the Cat4 LBT mechanism before performing the transmission on resource #2. In an embodiment, UE2 may perform a Cat4 LBT mechanism with a relatively high priority. On resource #3, UE1 and UE2 use the same beam direction, and then UE1 and UE2 need to use an LBT mechanism based on a single beam direction. In an embodiment, UE1 and UE2 may perform LBT at different time domain positions. For example, UE1 performs LBT earlier than UE2 does. In this case, if energy/interference detected by UE2/UE1 is greater than or equal to the first detection threshold and less than or equal to the second detection threshold, it is considered that the channel detected by UE1/UE2 is clear. In another manner, UE1 and UE2 perform LBT at the same position and/or at the same time moment. In the same manner, transmissions may be performed on subsequent resources in the manner described above. In an embodiment, the UE may be instructed by the base station via dynamic signaling to perform an LBT operation. The spatial multiplexing/reuse manner provided by the embodiments of the present disclosure is also applicable to spatial multiplexing/reuse on a base station side.

A multiplexing manner between devices in the case of an information exchange is illustrated by using another example. For spatial multiplexing/reuse between base stations, the base stations exchange information before performing transmissions. The exchanged information includes at least one of: the beam index information, the time domain resource information (such as the time domain pattern), the frequency domain resource information, the SCS, the transmission structure of the MCOT, the subframe/slot structure, the LBT mechanism, the LBT position, or the LBT mode. For example, different base stations inform surrounding base stations of transmission beam index information corresponding to their respective resources. Alternatively, different base stations inform surrounding base stations of inapplicable beam index information corresponding to their respective resources. In an embodiment, the base station may notify the UE of the information. Based on the exchanged information, the base station/UE performs the LBT mechanism before performing a transmission on a corresponding resource and performs the transmission in a beam direction in which the channel is detected to be clear. In an embodiment, the base station may dynamically indicate whether the LBT mechanism needs to be performed before a current transmission and/or the LBT mechanism/mode and/or the LBT position.

In another manner, the same pattern of beam directions is configured for devices under the same operator. Alternatively, different patterns of beam directions are configured for different UEs in the same cell. Alternatively, different patterns of beam directions are configured for different operators. The device may perform the LBT mechanism in at least one beam direction in a configured beam pattern. If it is detected that the channel is clear, a transmission may be performed on at least one of beams where the channel is detected to be clear. The same LBT detection position may be configured for devices using the same beam direction. In an embodiment, a method of double detection thresholds may be employed in order to improve the spatial multiplexing/reuse factor. Different LBT detection mechanisms and/or different LBT detection start positions may also be configured according to priorities of the devices using the same beam direction or priorities of signals/channels transmitted by the devices.

An embodiment of the present disclosure further provides an information transmission apparatus including a transmission module. The transmission module is configured to perform an information transmission on configured resources.

Figure 15:
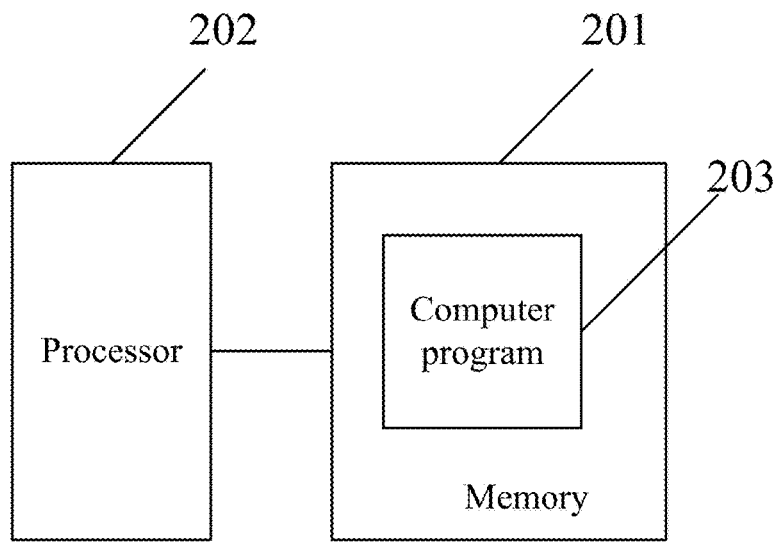
FIG. 15 is a schematic diagram of an information transmission device according to an embodiment of the present disclosure.

As shown in FIG. 15, an embodiment of the present disclosure further provides an information transmission device. The information transmission device includes a memory 201, a processor 202, and a computer program 203 stored on the memory 201 and executable by the processor 202. The processor 202 performs the information transmission method when executing the computer program 203.

An embodiment of the present disclosure further provides a computer-readable storage medium, which is configured to store computer-executable instructions for performing the information transmission method.

In this embodiment, the storage medium may include, but is not limited to, a USB flash disk, a Read-Only Memory (ROM), a Random-Access Memory (RAM), a mobile hard disk, a magnetic disk, an optical disk, or another medium capable of storing program codes.

It is to be understood by those having ordinary skill in the art that some or all steps of the preceding method and function modules/units in the preceding system or apparatus may be implemented as software, firmware, hardware and suitable combinations thereof. In the hardware implementation, the division of the preceding function modules/units may not correspond to the division of physical components. For example, one physical component may have multiple functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a RAM, a ROM, an Electrically Erasable Programmable Read-Only Memory (EEPROM), a flash memory or other memory technologies, a CD-ROM, a digital video disc (DVD) or other optical storages, a magnetic cassette, a magnetic tape, a magnetic disk or other magnetic storage devices, or any other medium that can be used for storing desired information and that can be accessed by a computer. Moreover, as is known to those having ordinary skill in the art, communication media generally include computer-readable instructions, data structures, program modules or other data in carriers or in modulated data signals transported in other transport mechanisms and may include any information delivery medium.

What is claimed is:

1. An information transmission method, comprising:
performing, by a device, a channel access procedure comprising one of the following:
in a case where transmission is transmitted in different beams, performing, by the device, the channel access procedure using a Category 3, Cat3, Listen Before Talk, LBT, mechanism in the different beams independently before the transmission is transmitted; or
in a case where transmission is transmitted in different beams within a Channel Occupancy Time, COT, performing, by the device, the channel access procedure using a Cat2 LBT mechanism before switching to a different beam within the COT; and
in response to a result of the channel access procedure, performing, by the device, a transmission in one or more beams.

2. The method of claim 1, wherein transmission is transmitted in different beams, and the channel access procedure is performed using the Cat3 LBT mechanism in the different beams independently before the transmission is transmitted, the method comprises:
in response to detecting that a channel is busy, abandoning, by the device, performing the transmission on a current resource; or
in response to detecting that a channel is busy, continuing, by the device, the channel access procedure according to at least one of a previous LBT mode or a previous LBT mechanism before a next candidate transmission start position; or
in response to detecting that a channel is busy, changing, by the device, a beam direction in which the LBT mechanism is performed, and retrying the channel access procedure; or
in response to detecting that a channel is busy, performing, by the device in the plurality of beam directions, the channel access procedure using a simplified LBT mechanism of a previous LBT mechanism or using a fast LBT mechanism before a next candidate transmission start position.

3. The method of claim 1, wherein performing, by the device, the transmission in one or more beams comprises:
performing, by the device, the transmission in a plurality of beams;
performing, by the device, the transmission on a current resource in a beam containing a beam corresponding to at least one of subsequent resources; or
performing, by the device, the transmission simultaneously in a plurality of beams, wherein a number of the plurality of beams has a decreasing trend as a resource index increases.

4. The method of claim 1, wherein in a case where transmission is transmitted in different beams within the COT, and the channel access procedure is performed using a Cat2 LBT mechanism before switching to a different beam within the COT, the performing, by the device, a transmission in one or more beams, comprises:
in response to detecting that a channel is clear using the Cat2 LBT mechanism, performing, by the device, the transmission in one or more beams within the COT; or
wherein in a case where transmission is transmitted in different beams, and the channel access procedure is performed using the Cat3 LBT mechanism in the different beams independently before the transmission is transmitted, the performing, by the device, a transmission in one or more beams, comprises:
in response to a beam direction in which a channel is detected to be clear, performing, by the device, transmission in the beam in which the channel is detected to be clear.

5. The method of claim 1, wherein within the COT, the channel access procedure is performed according to at least one of:
in a case where a gap between a downlink transmission and a previous uplink transmission or a gap between an uplink transmission and a previous downlink transmission is less than or equal to a first threshold, not performing, by the device, an LBT mechanism or the channel access procedure; or
in a case where a gap between a downlink transmission and a previous uplink transmission or a gap between an uplink transmission and a previous downlink transmission is greater than a second threshold, performing, by the device, the Cat2 LBT mechanism or performing the Cat2 LBT mechanism for M times.

6. The method of claim 1 or 4, wherein a duration for performing the channel access procedure using the Cat2 LBT mechanism is 16 μs or 25 μs.

7. An information transmission device, comprising a memory, a processor, and a computer program stored on the memory and executable by the processor, wherein the processor performs the information transmission method of claim 1 when executing the computer program.

8. A non-transitory computer-readable storage medium, which is configured to store a computer program, wherein the computer program, when executed, implements the information transmission method of claim 1.

* * * * *